(12) United States Patent
Regev

(10) Patent No.: US 11,254,430 B2
(45) Date of Patent: Feb. 22, 2022

(54) TILT WINGED MULTI ROTOR

(71) Applicant: Amit Regev, Moshav Bizaron (IL)

(72) Inventor: Amit Regev, Moshav Bizaron (IL)

(*) Notice: Subject to any disclaimer, the term of this patent is extended or adjusted under 35 U.S.C. 154(b) by 0 days.

(21) Appl. No.: 17/067,764

(22) Filed: Oct. 12, 2020

(65) Prior Publication Data

US 2021/0024213 A1    Jan. 28, 2021

Related U.S. Application Data

(63) Continuation-in-part of application No. 16/737,910, filed on Jan. 9, 2020, now abandoned, which is a continuation-in-part of application No. 16/234,576, filed on Dec. 28, 2018, now abandoned, which is a continuation-in-part of application No. 15/505,078,
(Continued)

(30) Foreign Application Priority Data

Sep. 2, 2014   (IL) .......................................... 234443

(51) Int. Cl.
| | |
|---|---|
| *B64C 3/38* | (2006.01) |
| *B64C 27/02* | (2006.01) |
| *B64C 27/28* | (2006.01) |
| *B64C 39/02* | (2006.01) |
| *B64C 27/20* | (2006.01) |

(52) U.S. Cl.
CPC .............. *B64C 39/024* (2013.01); *B64C 3/38* (2013.01); *B64C 27/027* (2013.01); *B64C 27/20* (2013.01); *B64C 27/28* (2013.01); *B64C 2201/027* (2013.01); *B64C 2201/141* (2013.01)

(58) Field of Classification Search
CPC ....... B64C 27/008; B64C 27/10; B64C 27/22; B64C 27/52; B64C 29/033; B64C 3/38; B64C 27/027; B64C 27/20; B64C 27/28; B64C 39/024; B64C 2201/027; B64C 2201/141
USPC ....................................................... 244/17.23
See application file for complete search history.

(56) References Cited

U.S. PATENT DOCUMENTS

| | | |
|---|---|---|
| 1,891,166 A | 12/1932 | Leupold |
| 3,181,810 A | 5/1965 | Olson |
| 3,430,894 A | 3/1969 | Strand et al. |

(Continued)

FOREIGN PATENT DOCUMENTS

| | | |
|---|---|---|
| CN | 101575004 | 11/2009 |
| CN | 102285450 | 12/2011 |

(Continued)

OTHER PUBLICATIONS

Communication Pursuant to Article 94(3) EPC dated Aug. 18, 2021 From the European Patent Office Re. Application No. 15837845.5. (7 Pages).

(Continued)

*Primary Examiner* — Joshua E Rodden

(57) ABSTRACT

A multirotor aircraft that includes a chassis, at least three engines that are equipped with propellers, and one or more axial free wings that are connected to the chassis by axial connections. The leading edges of the one or more axial free wings are designed to face constantly same direction when the multirotor flying, and the attack angles of the one or more axial free wings are designed to be changed relatively to the chassis due to flow of air over the one or more axial free wings.

6 Claims, 5 Drawing Sheets

Related U.S. Application Data filed as application No. PCT/IL2015/050874 on Aug. 31, 2015, now abandoned.

(56) References Cited

U.S. PATENT DOCUMENTS

| | | | |
|---|---|---|---|
| 5,340,057 A | | 8/1994 | Schmittle |
| 5,672,086 A | * | 9/1997 | Dixon .................. A63H 27/00 446/37 |
| 5,769,359 A | * | 6/1998 | Rutan .................. B64C 3/385 244/120 |
| 7,506,837 B2 | | 3/2009 | Parks |
| 8,931,730 B2 | | 1/2015 | Wang et al. |
| 8,991,740 B2 | | 3/2015 | Olm et al. |
| 9,109,575 B2 | | 8/2015 | Weddendorf et al. |
| 9,561,849 B2 | * | 2/2017 | Welsh .................. B64C 27/52 |
| 9,676,477 B1 | * | 6/2017 | Kimchi ................ B64C 39/024 |
| 9,764,829 B1 | | 9/2017 | Beckman et al. |
| 9,878,786 B2 | | 1/2018 | Chan et al. |
| 10,086,937 B2 | | 10/2018 | Matsue et al. |
| 2002/0104922 A1 | | 8/2002 | Nakamura |
| 2005/0230519 A1 | | 10/2005 | Hurley |
| 2007/0023581 A1 | | 2/2007 | La |
| 2008/0048065 A1 | | 2/2008 | Kuntz |
| 2009/0008499 A1 | | 1/2009 | Shaw |
| 2010/0108801 A1 | | 5/2010 | Olm et al. |
| 2011/0001020 A1 | | 1/2011 | Forgac |
| 2012/0083945 A1 | | 4/2012 | Oakley et al. |
| 2013/0105635 A1 | | 5/2013 | Alzu'bi et al. |
| 2014/0008498 A1 | | 1/2014 | Reiter |
| 2014/0124613 A1 | * | 5/2014 | Yang .................. B64C 37/00 244/12.4 |
| 2014/0131507 A1 | | 5/2014 | Kalantari et al. |
| 2014/0263823 A1 | | 9/2014 | Wang et al. |
| 2016/0010627 A1 | * | 1/2016 | Austin .................. F03D 13/20 290/55 |
| 2016/0032895 A1 | | 2/2016 | Weddendorf et al. |
| 2016/0137298 A1 | | 5/2016 | Youngblood |
| 2016/0244157 A1 | | 8/2016 | Welsh |
| 2016/0272312 A1 | | 9/2016 | Mallard |
| 2016/0272313 A1 | | 9/2016 | Chan |
| 2017/0305526 A1 | * | 10/2017 | Thomassey ............ B64C 27/26 |
| 2017/0327218 A1 | * | 11/2017 | Morin .................. B64C 39/024 |
| 2017/0369162 A1 | | 12/2017 | Alzahrani |
| 2018/0086442 A1 | | 3/2018 | Regev |
| 2018/0215465 A1 | * | 8/2018 | Renteria ................ B64C 27/28 |
| 2018/0281941 A1 | * | 10/2018 | Hutson ................ B64C 39/024 |
| 2019/0031361 A1 | * | 1/2019 | McCullough ........... B64C 39/02 |
| 2019/0061934 A1 | | 2/2019 | Kawiecki et al. |
| 2019/0106207 A1 | * | 4/2019 | Park .................... B64C 39/024 |
| 2019/0135420 A1 | | 5/2019 | Regev |
| 2020/0140080 A1 | | 5/2020 | Regev |

FOREIGN PATENT DOCUMENTS

| | | |
|---|---|---|
| CN | 102358420 | 2/2012 |
| DE | 102008025607 | 12/2009 |
| JP | 2012-228944 | 11/2012 |
| RU | 2324626 | 2/2008 |
| RU | 2375252 | 12/2009 |
| WO | WO 2016/035068 | 3/2016 |
| WO | WO-2016/120833 | 8/2016 |
| WO | WO 2014/168511 | 4/2021 |

OTHER PUBLICATIONS

Communication pursuant to Rule 164(1) EPC dated Mar. 16, 2018 From the European Patent Office Re. Application No. 15837845.5. (13 Pages).
Examination Report dated Jun. 1, 2021 From the Instituto Mexicano de la Propiedad Industrial, Direccion Divisional de Patentes Re. Application No. MX/a/2017/002826 and Its Translation Into English. (7 Pages).
Examination Report dated May 5, 2020 From the Scrvico Publico Federal, Ministerio da Economia, Instituto Nacional da Propriedade Industrial do Brasil RE Application No. BR112013014918.3. (4 Pages).
Examination Report Under Sections 12 & 13 of the Patents Act, 1970 and the Patents Rules, 2003 dated Dec. 26, 2019 From the Government of India, Intellectual Property India, Patents, Designs, Trade Marks, Geographical Indications, The Patent Office Re. Application No. 201717006351. (7 Pages).
International Preliminary Report on Patentability dated Mar. 16, 2017 From the International Bureau of WIPO Re. Application No. PCT/IL2015/050874. (8 Pages).
International Search Report and the Written Opinion dated Jun. 20, 2016 From the International Searching Authority Re. Application No. PCT/IL2015/050874. (11 Pages).
Notice of Reason(s) for Rejection dated Mar. 22, 2021 From the Japan Patent Office Re. Application No. 2017-530454. (2 Pages).
Official Action dated Jul. 10, 2019 From the US Patent and Trademark Office Re. U.S. Appl. No. 16/234,576. (11 Pages).
Official Action dated May 10, 2019 From the US Patent and Trademark Office Re. U.S. Appl. No. 15/505,078. (6 Pages).
Official Action dated Sep. 10, 2020 From the US Patent and Trademark Office Re. U.S. Appl. No. 16/737,910. (8 Pages).
Official Action dated Jan. 29, 2019 From the US Patent and Trademark Office Re. U.S. Appl. No. 15/505,078. (14 Pages).
Official Action dated Apr. 30, 2019 From the US Patent and Trademark Office Re. U.S. Appl. No. 16/234,576. 74 Pages).
Request for Examination dated Feb. 6, 2019 From the (ROSPATENT), Federal Government Institution of Industrial Property of the Federal Service of Intellectual Property, Patents and Trademark of the Russian Federation Re. Application No. 2017110703 and Its Translation Into English.(8 Pages).
Request for Examination dated Apr. 26, 2021 From the (ROSPATENT), Federal Government Institution of Industrial Property of the Federal Service of Intellectual Property, Patents and Trademark of the Russian Federation Re. Application No. 2017110703 and Its Translation Into English.(7 Pages).
Restriction Official Action dated Nov. 28, 2018 From the US Patent and Trademark Office Re. U.S. Appl. No. 15/505,078. (6 Pages).
Retriction Official Action dated Mar. 1, 2019 From the US Patent and Trademark Office Re. U.S. Appl. No. 16/234,576. (6 Pages).
Supplementary European Search Report and the European Search Opinion dated Jun. 18, 2018 From the European Patent Office Re. Application No. 15837845.5. (12 Pages).

* cited by examiner

TILT WINGED MULTI ROTOR

RELATED APPLICATIONS

This application is a continuation in part of U.S. patent application Ser. No. 16/737,910 filed on Jan. 9, 2020 which is a continuation in part of U.S. Ser. No. 16/234,576 fiend on Dec. 28, 2018, which is a continuation in part of U.S. patent application Ser. No. 15/505,078 filed on Feb. 18, 2017 which is a National Phase of PCT Patent Application No. PCT/IL2015/050874 having International filing date of 31 Aug. 2015, which claims the benefit of priority of IL Patent Application No. 234443 filed on 2 Sep. 2014. The contents of the above applications are all incorporated by reference as if fully set forth herein in their entirety.

TECHNICAL FIELD

The present invention refers to a multi-winged aircraft with three or more engines, which is equipped with a free wing that can rotate freely around its longitudinal axis, thus providing the aircraft with lift during horizontal flight.

BACKGROUND ART

In recent years, a broad-based industry has emerged that engages in the development, manufacture, and use of aircraft able to take off vertically and then fly horizontally. These aircraft may be either manned or unmanned and have a variety of names, such as VTOL (vertical takeoff and landing) aircraft, multi-rotor aircraft, tilt aircraft, and more. Such aircraft are characterized by having several engines (propeller or jet) that enable vertical takeoff and landing of the aircraft. Once the aircraft is airborne, the orientation of the engines may be adjusted in order to propel the aircraft forward in horizontal flight. For the sake of the clarity, we shall, in this request, refer to said aircraft as "multirotor aircraft". Multirotor aircraft can take off, hover, and fly horizontally using either propeller engines or jet engines. The aircraft is controlled and stabilized using sensors and a flight control computer that control and transmit commands to the aircraft's engines and propellers. One advantage of multirotor aircraft is their ability to take off and land vertically, hover in the air, and even fly in the horizontal direction.

One of the disadvantages of multirotor aircraft lies in the relatively short time they can remain airborne. This limitation stems from the fact that when the aircraft is in horizontal flight, some of the energy from the engines is utilized for its horizontal, forward movement. Therefore, certain models of multirotor aircraft include wings, to enhance energy efficiency in horizontal flight. In certain models of multirotor aircraft equipped with wings, the engines are attached to the wings by a fixed connection, so that the angle between them is fixed, and rotary movement of the engines occurs simultaneously with wing rotation. In other models, the wing and engines are fixed in relation to the chassis. The disadvantage of the aforementioned aircraft in which engines and wing are interconnected by a fixed connection, comes into play both during takeoff and landing and when hovering. When the wings are vertical relative to the earth (with engines facing upwards, functioning as in a helicopter) and conditions are windy, drag and instability ensue. Similarly, in the case of aircraft in which both engines and the wing are connected to the chassis by a fixed connection, a negative lift and/or drag is created on the wing during takeoff, hovering, or landing with either a rear wind or a side wind. This causes loss of energy (requiring increased engine operation) or worse, causes the aircraft to deviate from its vertical landing line or hovering point. This problem becomes especially severe when such aircraft is to be landed on the roof of a building, in which case a side wind at the precise moment of landing may divert the aircraft from its landing point.

Using actuators and various mechanical mechanisms to stabilize the aircraft reduce the reliability, due to the addition of components as said, and when the components are critical for flight, this becomes a real hazard. Furthermore, said mechanisms are heavy and thus reduce the maximum flight time or freight-carrying capacity of the aircraft. Accordingly, in this invention free wings that can move freely on their longitudinal shaft are attached to the multirotor. The free wings may be either controlled by an actuator or they may be uncontrolled, in which case the angle and lift they produce are a result of the flow of air in relation to them. The term "flow of air" means the flow of air over the wing a result of the movement of the wing in the air or a wind and the like and not a flow of air from the engines or the propellers.

We shall now summarize the problem that exists with the various models of winged multirotor aircraft: (a) in aircraft equipped with a wing that is fixed relative to the chassis: during horizontal flight, the wing functions as in a conventional aircraft. When hovering (during which the aircraft remains in place above a fixed point on the earth) or when landing (when the aircraft is positioned vertically above a fixed point on the earth) and when conditions are not windy, no problem arises. However, if a side wind, gusts of wind, or a rear wind occurs, the aircraft is shifted from the fixed point, and this poses a problem as previously mentioned. (b) in aircraft equipped with a wing that is fixed to the engines, in which the engines rotate together with the wing relative to the aircraft chassis: during horizontal flight, the aircraft functions as a conventional airplane. However, when hovering or landing, the engines face upward while the wings are directed vertically towards the ground; thus, any wind from any direction causes the aircraft to shift from said fixed point. In addition, there it is impossible to control the disturbance, since moving the wing itself has an effect, creating a clash between the correcting of the engines and of the wings.

CN102285450 patent application describes a three-axis aircraft that includes a fuselage, three tail pipes and three rotors which are positioned at the end of each of those tail pipes. It is known in the art that when multirotor aircraft equipped with four or any even number of rotors then half of them should be rotates to one direction and the other half to the other direction, any by that preventing yawing of the aircraft about its vertical axis. The three axis aircraft of CN102285450 patent application includes three motors and therefore the rotation direction of the third rotor may causes yawing, assuming that the first two rotors are nullify each other. For preventing this result, the inventor of CN102285450 patent application adds a guide vane which is positioned on the tail pipe of this third rotor for creating a horizontal force that nullify the horizontal moment of this third rotor and by that the prevent the potential yawing of the three-axis aircraft. This guide vane is controlled by a steering gear which is designed to control its tilt angle for achieving the correct horizontal force that should be equal to the horizontal moment force of this third rotor. It is clear that the guide vane of CN102285450 is not a free wing and it is fixed to the tail pipe by means such as steering gear for controlling its angle. In addition, the guide vane serves for nullifying the yawing potential of the three-axis aircraft and not for providing upward lift forces during flying and also not for energy saving.

JP2012/228944 patent application describes a multi-rotor helicopter four passive blade plates positioned in each side of the multi-rotor helicopter. In general, the rotors of a multi-rotor helicopter in hovering position should be absolutely vertical and in case of a cross-wind the helicopter must have inclination angle to remain in a hovering position over the same point. For dealing with such situation the multi-rotor helicopter is equipped with sensors that control the angle of the multi-rotor helicopter according the speed and the direction of the cross-wind. The inventor of the invention subject matter of JP2012/228944 patent application adds these four passive blade plates in each side of the multi-rotor helicopter so that the cross-wind exerts power on the specific passive blade plate that faces the cross-wind and by that causes the multi-rotor helicopter to incline. These four passive blade plates are designed to provide the solution of those expensive sensors. These passive blade plates are not designed or shaped as a wing at all, they do not provide a lifting force, and they are serve for inclining the multi-rotor helicopter and not for providing upward lift forces during flying and also not for energy saving.

Publication U.S. Pat. No. 5,823,468 (Publication 468) discloses a lighter than air aircraft (TLA) capable of vertical take-off and landing (VTOL), running vertical take-off and landing (R-VTOL) and short take-off and landing (S-STOL). The aircraft of Publication 468 includes wings that each of them has propelling means, and the pivotal movement of the wings and of the propelling means is controllable by a computer. The wings are pivotal about their natural axis so that minimal force is required to make significant changes in the attitude of an individual wing. The wings in Publication 468 are not free wings as of the present patent application. The controlled wings in Publication 468 are not guided or controlled by the atmospheric wind as the free wings of the present patent application.

The free wings of the aircraft of the present patent application are free to rotate on their horizontal axis according the power of the wind and the gravitation whereas the wings of Publication 468 are controlled by the user that controls and determines their angle. This characteristic can be seen in Publication 468 in several aspects of those wings, for example: (a) the angle of the wings in Publication 468 are up to 130 degrees in certain hover flight control conditions; (b) the differential angle degrees between rotor axis positioning and wing position are controlled and determined by the user makes it possible to determine and control those angles. These in a contrary to the free wings of the present patent application that are in fact free wings.

Publication US2012/0119016 (Publication 016) discloses a modular vehicle that able to drive on land, cruise on water and fly while having vertical and landing capabilities. The vehicle plurality of propellers is connected to the vehicle by support arms. It is understood that when the propellers are in operation the air flows vertically downward and when air flows over a rod (even rounded) a strong downward drag is created that drags it downwardly. To overcome this problem, the inventor of Publication 016 wraps this support arm with an airfoil, so that when the vehicle takes-off then the air that flows vertically downwardly on this supports arms that are warped by the airfoil is decreases. In a contrary to that, the free wings of the present invention are designed in a different manner and serves for different purposes and the structure of the aircraft subject matter of the present invention and of the vehicle of Publication 016 are different.

The position and location of the free wing of the present invention is designed to avoid a clash between the vertical downwardly propellers thrust and the airflow over the free wing as much as possible so that the free wing will be free to rotate by the wind air flow, a wind or as a result of movement forward of the aircraft, and to provide lift when flying forward, otherwise the propeller vertical thrust on the free wing will create a clash between two strong forces—the airflow and the thrust, which eventually will damage the control of the aircraft and its function. On the other hand, the airfoils of Publication 016 are designed specifically to be positioned under the operation propellers area for reducing the vertical drag over the rod but creating alternative reduced drag over the airfoil itself and during flying forward the drag of the airfoils even increased.

Publication U.S. Pat. No. 3,934,843 (Publication 843) refers to a Bi-copter as a contrary to the multirotor aircraft subject matter of the present invention which includes at least three engines. The structure and the control of these aircraft are different one form the other. The wings in Publication 843 or substantial part of them are under the propeller operation area, which is the imaginary circle that the tips of the blades mark in the air while the blades rotate. As a result, the air that flows vertically downward with high speed from the propellers creates strong flow on these wings and dictates the wing angle position, while in the present invention the airflow created by the movement forward and the atmospheric wind dictate the wing angle position. So, for example, when flying horizontally the vertical airflow damages the lift of the wings. Also, while hovering with front or back wind, the combination of the vertical airflow and the front wind dictate the angle of the wing and this angel is not ideal for the front wind and therefore this front wind pushes back the aircraft. As a contrary to that, the free wings of the multirotor aircraft of the present invention response to the atmospheric airflow without interference of a vertical airflow from the engines, due to their relative location.

U.S. Pat. No. 5,672,086 (Dixon) discloses a rotational B-copter (310) that comprises a chassis (316), two rotors and a pair of wings (312 and 314) that are pivotally affixed to the chassis. The rotational B-copter of Dixon and its pair of wings rotate around fixed self-axis, and can fly vertically and horizontally while rotating constantly. When the user activates the rotors then the rotational B-copter rotates horizontally around a vertical self-axis point that is located at the mid-distance between the rotors, and the pair of wings too horizontally rotates around this self-axis point. It means that the pair of wings of the rotational B-copter of Dixon constantly rotates around that vertical axis.

The pair of wings of the rotational B-copter of Dixon provides vertical lifts during all the time that the rotational B-copter flies or hovers. On the other hand, the free wing of the Multirotor Aircraft of the present invention provides lifts: (a) when flying horizontally, and (b) when confronting a front nose wind.

When the Multirotor Aircraft of the present invention is vertically take-off then the free wing tilts vertically and provide no lift. As a contrary to that, when the rotational B-copter of Dixon is vertically take-off then its pair of wings constantly rotates and provide lift power.

The rotational B-copter of Dixon and the Multirotor Aircraft of the present invention and their wings have different structure; they serve for different purposes and are designed to achieve different goals.

Dixon cannot be used as a prior art against the present invention. The fact that there is a free wing is not the novelty of the present invention. Rather, the use of a free wing in a multirotor, in a way that gives the new multirotor a new structure and new nonobvious functions are a core of the present invention. A professional in the field would not have taken it for granted to incorporate the free wing as it is taught and understood from the rotational B-copter of Dixon in a standard multirotor, as the goals that the free wing achieves in Dixon are different from the goals achieved in the multirotor aircraft of the present invention. It is not obvious to combine the pair of wings of the rotational B-copter of Dixon with a standard multirotor for achieving the goals as achieved in the Multirotor Aircraft of the present invention.

A combination of two components that appear in two separate prior art publications is obvious to a professional in the field only in the event that both said components function in the combined structure in same way as they are function in the prior art publications, since only then their combination is obvious. But if the function of one component in the prior art publication differs in the combined structure, then the combination is not such obvious.

LIST OF DRAWINGS

The intention of the drawings attached to the application is not to limit the scope of the invention and its application. The drawings are intended only to illustrate the invention and they constitute only one of its many possible implementations.

THE INVENTION

The present invention refers to a multirotor aircraft with a free wing, designed so that, on the one hand, wings may be used to enhance flight efficiency and save energy and, on the other hand, the problem that exists with multirotor aircraft equipped with wings that are attached to the chassis or engines of the aircraft is avoided.

Figure 1A:
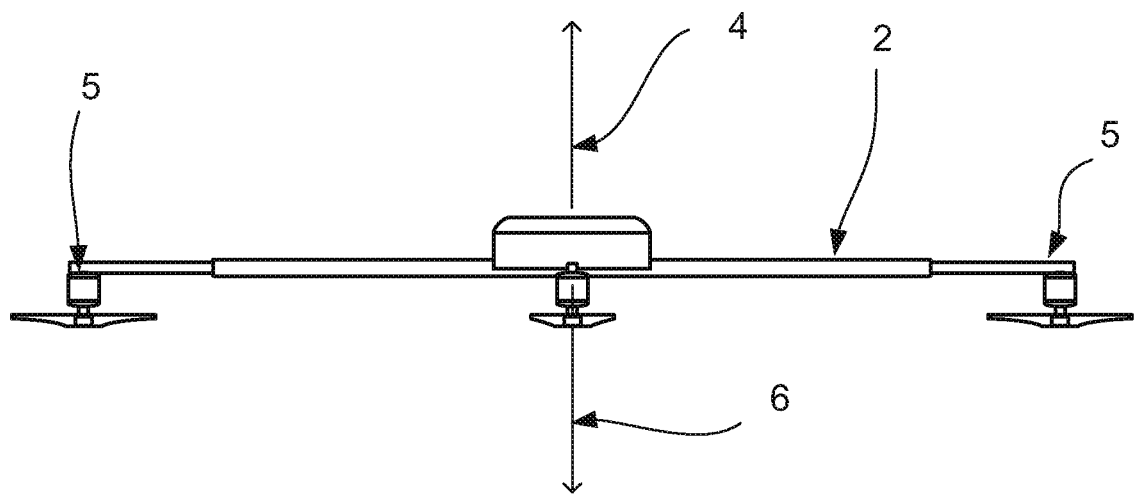
FIG. 1A depicts a multirotor aircraft in horizontal position, and the force vectors acting on it.
Figure 1B:
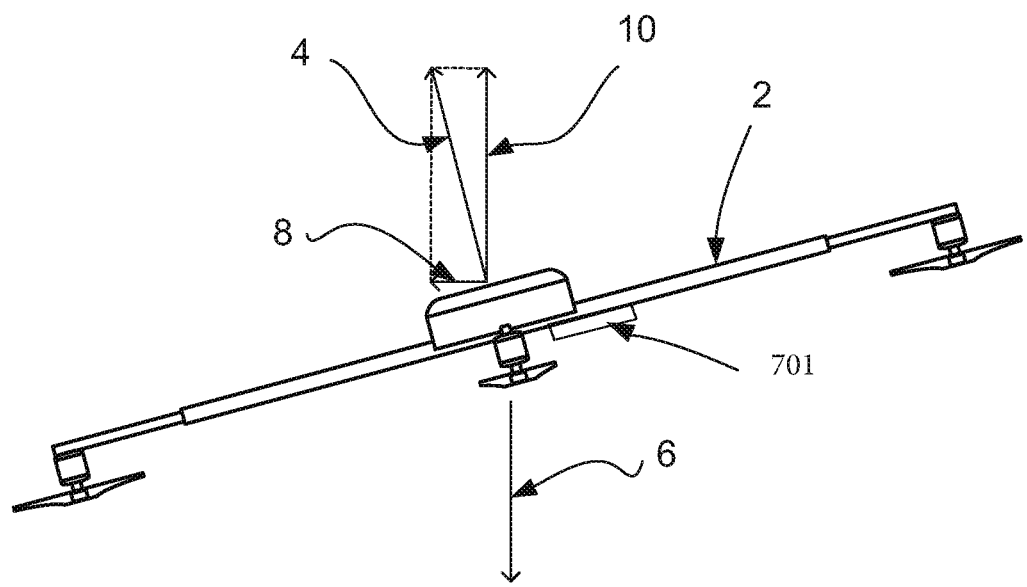
FIG. 1B depicts a multirotor aircraft tilted forward, and in horizontal flight forward.

The multirotor aircraft is stabilized and controlled autonomously by means of sensors and a flight computer that operate its engines and propellers. Thus, for example, if the user wants the aircraft to fly forward, the rear engines receive a command to accelerate, and the front engines receive a command to slow down. This creates the moment that rotates and tilts the craft forward, while the thrust propels it in the horizontal direction. Since some of the energy is required for forward motion, the power of the engines must be increased in order for the aircraft to maintain altitude; thus, the craft consumes more energy in this state, as depicted in FIGS. 1A and 1B. FIG. 1A depicts a multirotor craft (2) hovering in the horizontal position. The lift vector (4) is the overall force applied by the engines and propellers (5) and the gravity vector (6) is the center of gravity of the aircraft (2). When these two forces are equal in magnitude, the aircraft (2) is in a state of equilibrium i.e. hovering and maintaining its flight altitude.

Drawing 1B depicts an aircraft (2) tilted forward in horizontal forward flight (or when facing a wind), whereby the lift vector (4) is the resultant force created from the action of the engines and the propellers (5) that may be broken down into components so that the forward vector (8) is the component of the resultant force (4) that enables forward movement, and vector (10) is the component of the resultant force that determines craft altitude. It can be seen that vector (10) is smaller than both vector (4) and vector (6); hence, in this state the craft will lose altitude and descend. To enable the aircraft to maintain its altitude, the resultant force must be increased until vector (10) is equal to vector (6) i.e. the overall weight of the craft. This will result in equilibrium, enabling the craft to maintain flight altitude. Increasing the resultant force causes waste of energy and shortens flight time.

Figure 2:
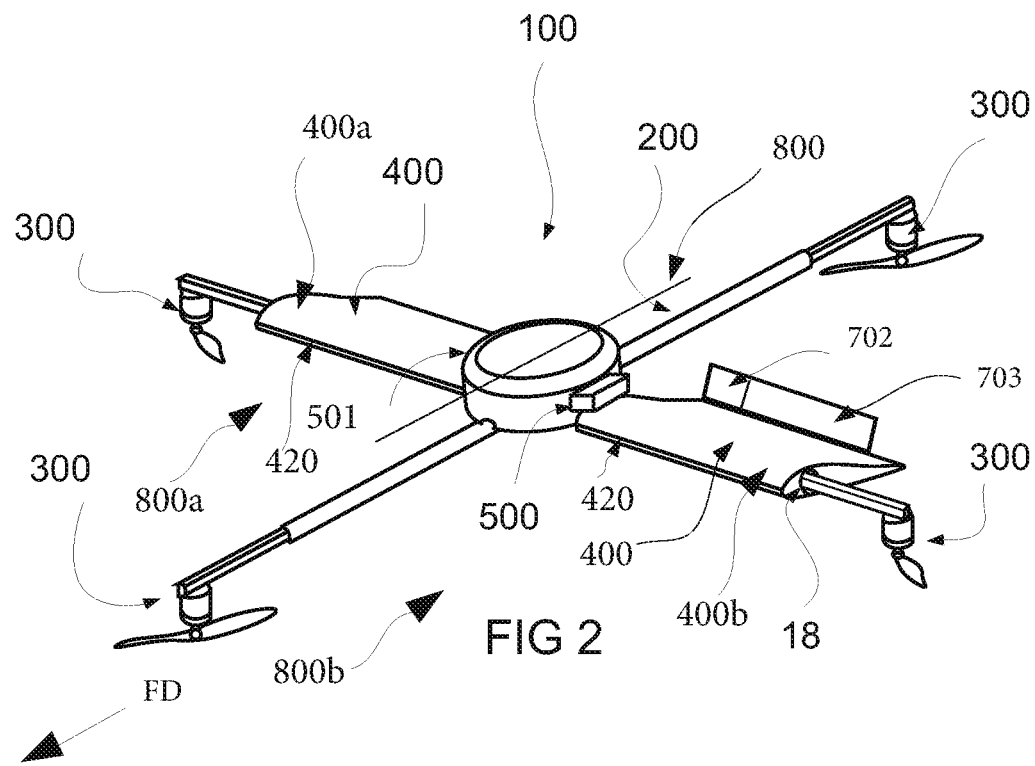
FIG. 2 depicts a multirotor aircraft (100) including a pair of free wings (400).
Figure 3:
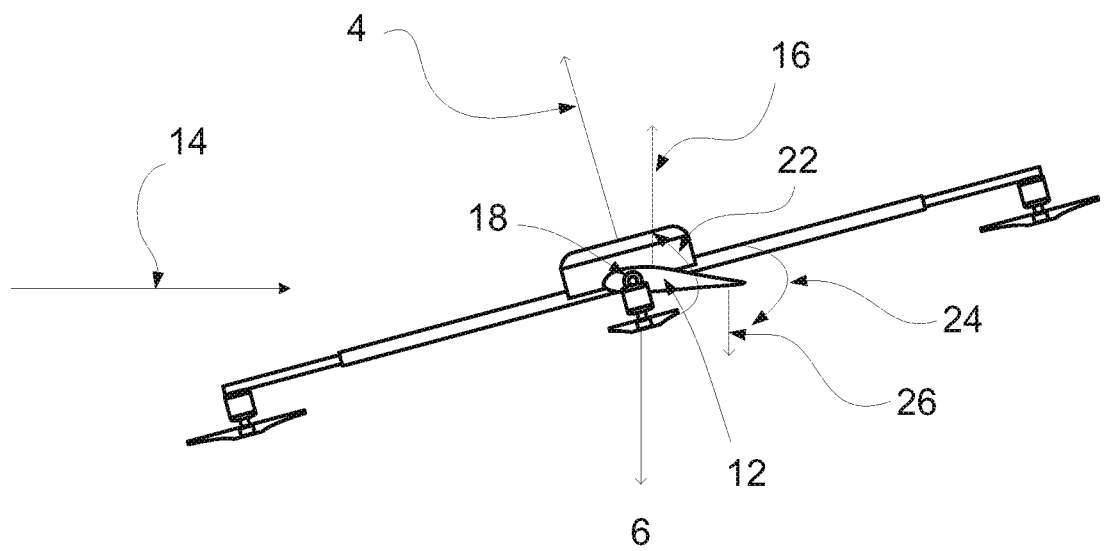
FIG. 3 depicts a multirotor aircraft (100) including free wings (400) and the force vectors acting on it in horizontal flight.

The present invention refers to a multirotor aircraft (100) that comprises a chassis (200), three or more engines that each of them is equipped with a propeller (300) (the term propeller relates to the conventional propeller, to jets engines, to any other thrust producing means), and a free wing (400) or pair of wings on either side of the chassis, as depicted in FIGS. 2 and 3. The free wing (400) is attached to the chassis (200) by means of an axial connection (18). Thus, the angle between the free wing (400) and the chassis (200) may be changed using a wing actuator (500) or by force of the flow of air over the wing. For sake of clarity, the free wing (400) will be referred hereinafter as the "axial free wing" and the wing which is controlled by the wing actuator (500) will be referred hereinafter as an "axial controlled wing". When referring to both they will be named as the "free wing".

As it is understood from FIGS. 2, 3, 6, 7, 8, and 9 it is possible that at least part of the free wing (400) is positioned within the imaginary geometric field between the propellers (300).

In order for the free wings (400) to create lift in flight with a horizontal component (hereinafter "horizontal flight"), they must be at a specific positive attack angle relative to the airflow direction (14). Since the chassis (200) tilts forward towards the airflow, it is important that the free wing (400) not be permanently attached to the chassis. Otherwise, a negative angle will be created, causing loss of both altitude and energy.

To bring the axial controlled wing (400) to a specific positive angle relative to the airflow, the wing actuators that govern this wing steering or computer-controlled wing-mounted engines may be used. Alternatively, the totally axial free wing (400) may be used that attains its optimal state relative to air movement automatically, without intervention. This is possible thanks to the wing's structure, but in this case it will be less aerodynamically efficient for a variety of flight positions.

The free wing (400) is attached to the chassis (200) by means of an axle (18), in such a way that enables the free wing to rotate freely around this axle. The axial free wing (400) is automatically stabilized against the airflow (14) or the axial controlled wing (400) is stabilized by the computer-controlled wind detector (501), adding upward lift, which is denoted as a vector (16) and supplements the lift created by the engines (300).

The wing actuator (500) is designed to control the axial controlled wing (400) and to bring the axial controlled wing (400) to specific positive angle relative to the airflow. The direction and intensity of the airflow over the axial controlled wing (400) dictates the operation of the wing actuator (500) and determines the specific positive angle of the axial controlled wing (400) relative to the airflow. The wing actuator (500) may be for example a type of a steering assist system that operates on the same principles as a wheel steering assist system so when the airflow creates power on the axial controlled wing (400) then the steering assist system rotates the axial controlled wing (400) until equilibrium. The wing actuator (500) may be for example a type of a motor, a propeller, or any other means of rotating the axial controlled wing (400) according the direction and intensity of the airflow over the axial controlled wing (400). The wing actuator (500) may include a computer-controlled wind detector (501) that senses the direction and the intensity of the airflow over the axial controlled wing (400).

The free wing, depicted for instance, in FIG. 3, may rotate freely around the axle (18). Vector (16) is the upward lift created by the free wing, whose center is positioned behind the axle (18), thus creating moment (22) that causes the trail edge of the wing to rise around the axle (18). A control surface located on the free wing or the upward tilting of the trail edge of the free wing result in a downward force (26) that causes moment (24) in the opposite direction of upward moment (22), until a state of equilibrium is reached in which the free wing is stabilized vis-à-vis the airflow and produces lift. To maintain efficiency while hovering, the aircraft (100) must be kept facing the wind, and when in flight, the wing must be kept free vis-à-vis the airflow. Designated software, the flight computer, and sensors installed on the aircraft are all used to maintain the orientation of the free wing (400) during horizontal flight.

It is clear from the aforementioned and from the drawings attached to this patent application that the present invention refers to multirotor aircraft (100) with three or more propellers (300) that are attached to the chassis (200) of the aircraft (100) by a fixed connection, so that the angle between the propellers (300) and the chassis is a fixed. In addition, the aircraft (100), subject of the present invention, is equipped with one or more free wings (400), either the axial free wing or the axial controlled wing. In case of using the axial controlled wing the wing is connected to the chassis (200) by means of the axle (18) that enables to change the angle between the wing (400) and the chassis (200) of the aircraft (100). The attack angle of the axial controlled wing (400) may be changed using the actuator (500) that may be a motor, a propeller, or any other means of rotating the wing. Alternatively, In case of using the axial free wing then since the wing (400) is attached to the chassis by the axial connection (18) in such a way that it can rotate freely, its attack angle may change according to the flow of air towards and over the axial free wing (400). Thus, during horizontal flight, the horizontal airflow around the wing adjusts the attack angle of the wing in such a way that the lift vector of the wing (400) is in the upward direction. Thus, the vertical surface area of the axial free wing is reduced in case of a back and side horizontal wind and reducing the drag during hovering. This increases the lift of the aircraft (100) and reduces the amount of energy required to operate the propellers (300). The invention may be implemented in other versions of aircraft (100) by adding two free wings (400). In addition, the axial connection (18) of the wings (400) to the chassis (200) may be such that the wings may rotate 360 degrees.

When the aircraft (100) is hovering, taking off or landing in a side wind, for example, the aircraft (100) will tilt sideways towards the wind so as to remain above the ground point, and the wing will revolve until it reaches a position in which the leading edge of the wing (400) faces the wind, thus considerably reducing drag as well as the extent to which the aircraft (100) diverts from the ground point over which it is supposed to be. The free wing (400) may be equipped with controlled control surfaces (703) with surface actuator (702) to enable optimal, quick control of wing lift and of the aircraft, or with fixed control surfaces. In addition, the free wing (400) may be equipped with a limiting device (701) to limit the possibility of the wing revolving upward about its axle (18). In other words, in order to create lift at low speeds, the rear part of the wing should not rise above a certain angle. Said limiting device, however, should not prevent the rear part of the wing from being lowered, as required for takeoff, hovering, and landing.

When the multirotor equipped with the one or more axial free wings (400) then it comprises the chassis (200), at least three engines that each of the engines is equipped with a propeller (300), and the one or more axial free wings (400). The one or more axial free wings are connected to the chassis by the axial connections (18) in such a way that a first part (400a) of the one or more axial free wings is located on the right side (800a) of the axis roll (800) of the multirotor aircraft and a second part (400b) of the one or more axial free wings is located on the left side (800b) of the axis roll (800). The term "axis roll" in this connection is the actual axis roll according to the flight direction. The attack angle of said first part and the attack angle of said second part are constantly facing substantially same forward direction (FD) while the multirotor aircraft flying forward, and wherein said attack angles are designed to be changed relatively to the chassis due to flow of air over said one or more axial free wings.

When the multirotor aircraft is in hovering stage in conditions where there is no wind the one or more axial free wings are designed to be at a loose state and free to rotate axially on said axial connection. The term "loose state" in no wind conditions means that there is no lifting force on the wings, means, that only the gravity force acting on the wings on these conditions. When wind flows over the one or more axial free wings during hovering then a tilt angle of the one or more axial free wings is changed by forces of said wind to a position in which a drag force on said one or more axial free wings is reduced. Whereby the reducing of said drag enabling a precise hovering relative to a ground point and enabling precise control over the multirotor aircraft; wherein the one or more axial free wings are designed to provide lift force in horizontal flight and in situations of front horizontal wind during hovering whereby reducing the amount of energy required to operate said multirotor aircraft.

It is also possible that the one or more axial free wings that are connected to the chassis by the axial connections will be connected in a way that all leading edges (420) of the one or more axial free wings are designed to face same direction when the multirotor aircraft is flying (and not hovering). When the multirotor aircraft is in hovering stage in conditions where there is no wind the one or more axial free wings are designed to be at a loose state and free to rotate axially on said axial connection.

As a contrary to the rotational B-copter of U.S. Pat. No. 5,672,086 (Dixon) the one or more axial free wings of the multirotor aircraft subject matter of the present invention are connected to the chassis by the axial connections in such a way that all the leading edges (420) of the one or more axial free wings are designed to face same direction when the multirotor aircraft is flying, and in such a way that the one or more axial free wings are designed to be at a loose state and free to rotate axially on said axial connections when the multirotor aircraft is in hovering stage in conditions where there is no wind. Unlike the wings in Dixon, the one or more axial free wings are connected to the chassis by the axial connections in such a way that when wind flows over the one or more axial free wings during hovering then the one or more axial free wings are designed to change their tilt angle by force of said wind to a position in which a drag force on the one or more axial free wings is reduced. In Dixon, on the other hand, the wings face wind constantly due to the fact that they are designed to rotate constantly.

It is clear from the aforementioned and from the drawings that the area of overlap between the imaginary circle that the tips of the blades of each engine (300) mark in the air while the blades rotates (hereinafter and in the claims the "propeller operation area") and the free wing (400) is less than fifty percent of the propeller operation area of said engine and less than thirty percent of a total area of the free wing (400). When wings or substantial part of them are under the propeller operation area then the air that flows vertically downward with high speed from the propellers creates strong drag on these wings.

Consequently, when flying horizontally the vertical airflow damages the lift of the wings. Also, while hovering with front or back wind, the combination of the vertical airflow and the front wind dictate the angle of the wing and this angel is not ideal for the front wind and therefore this front wind pushes back the aircraft. When the overlap area of the propeller operation area and the free wing (400) is less than fifty percent of the propeller operation area of said engine and less than thirty percent of a total area of the free wing (400) as in case of the present multirotor aircraft then the free wings response to the atmospheric airflow without interference of a vertical airflow from the engines, due to their relative remote location.

As to the multirotor aircraft that comprises the chassis, three engines that each of them is equipped with a propeller, and the axial free wing: each one of the at least three engines defines a lifting point and the plane geometric area between these lifting points defines a polygonal. This, as a contrary to the B-copter aircraft that has two engines and therefore only two lifting points that create a line which is unstable unlike the polygon that has at least three points structure.

Figure 4:
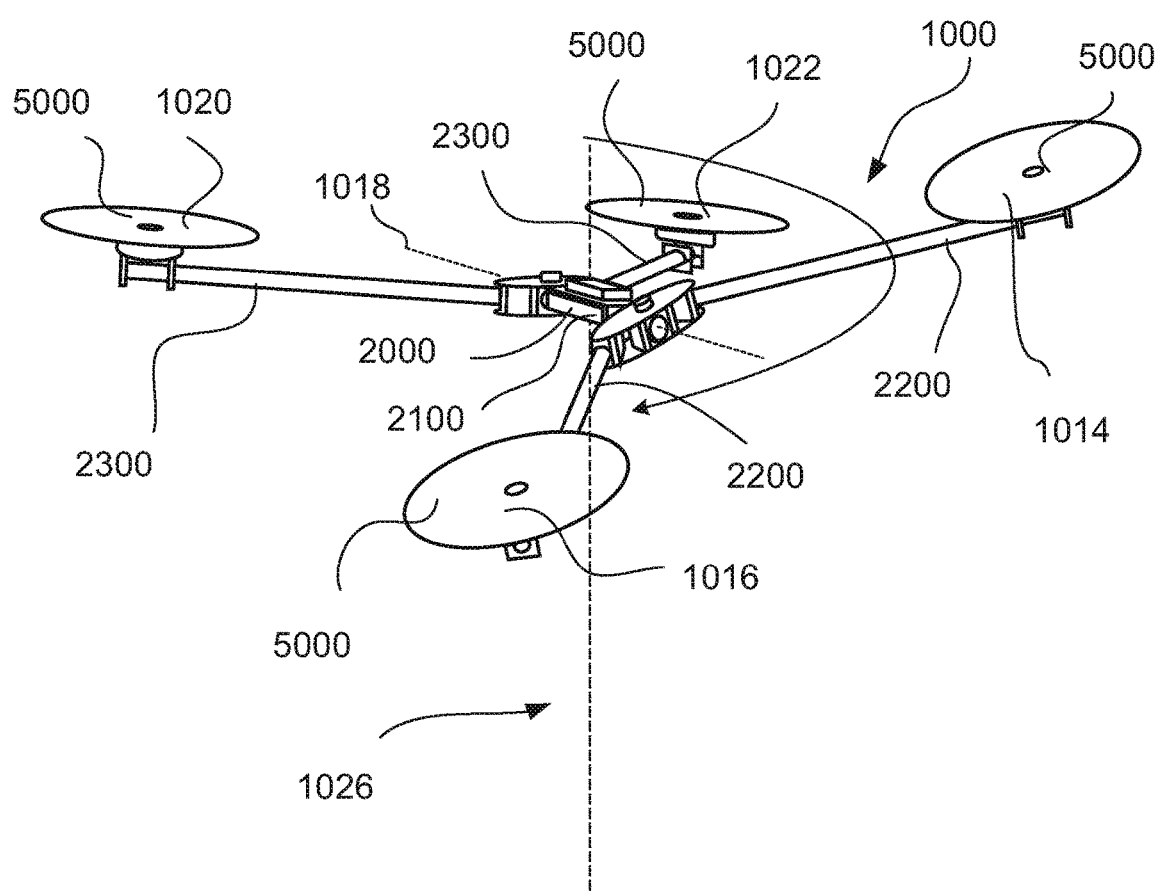
FIG. 4 depicts the multirotor (1000) yawing to the right.
Figure 5:
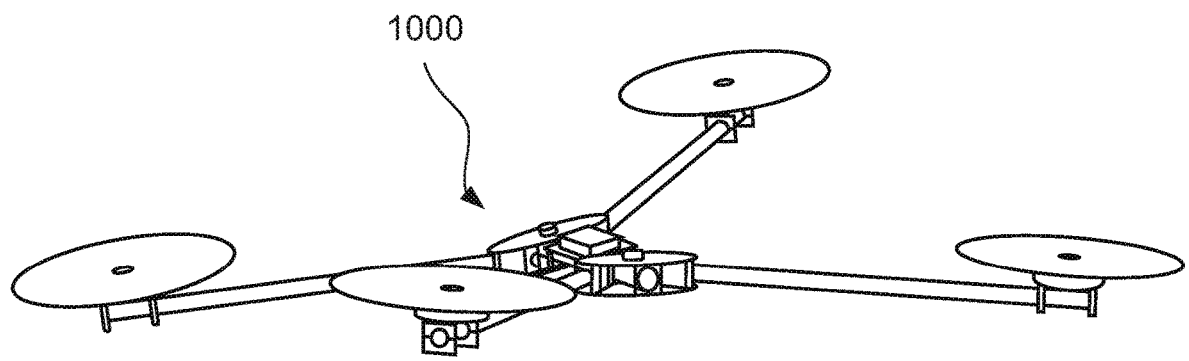
FIG. 5 depicts the multirotor (1000) yawing to the left.
Figure 6:
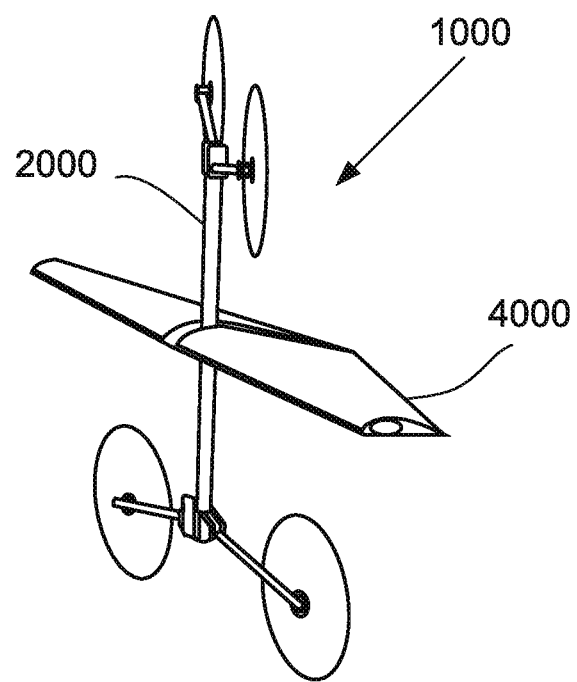
FIGS. 6-9 depict the multirotor (1000) equipped with a free wing (4000).
Figure 7:
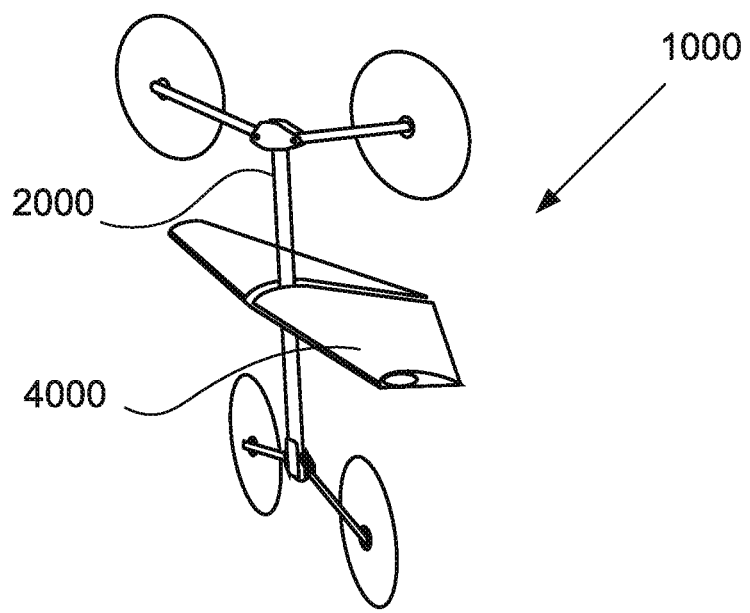
Figure 8:
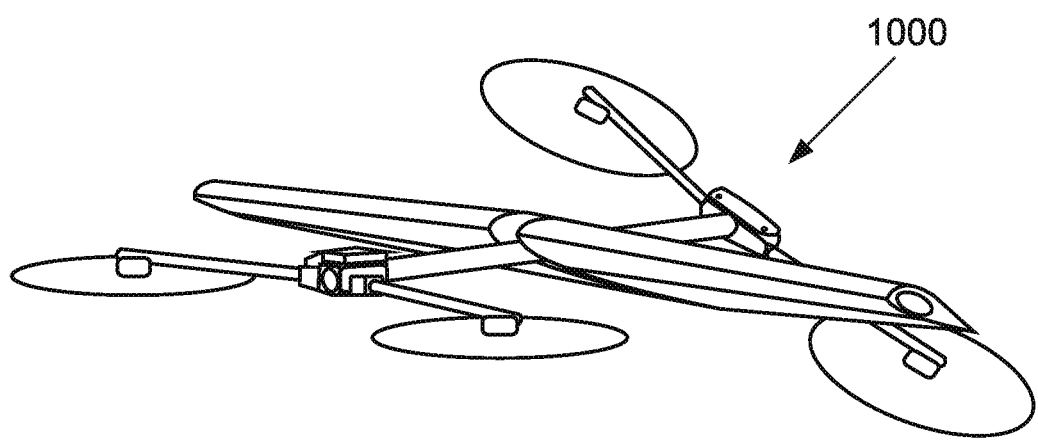
Figure 9:
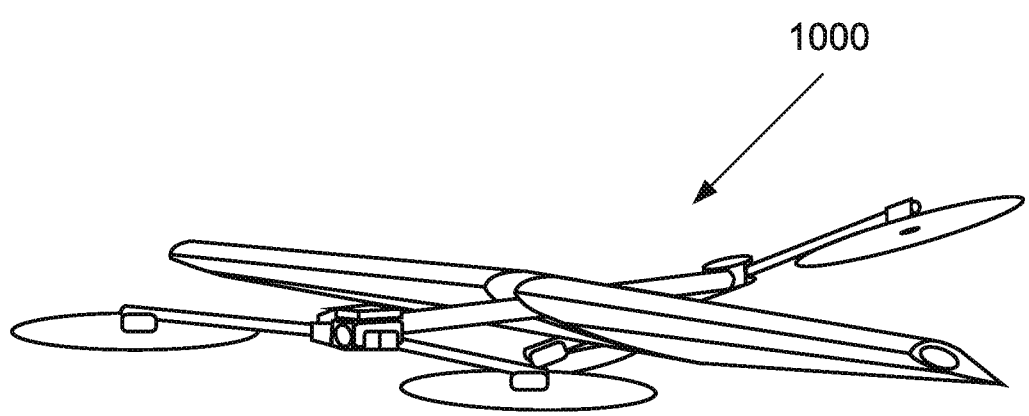

A second version of the present invention refers to the multirotor (1000) schematically depicted in FIGS. 4 and 5. The revolution around the axle (1026), which is the vertical axle in the multirotor aircraft (1000), is usually the result of the difference in moment between the propellers (5000) that are revolving clockwise and those that are revolving counterclockwise. These moments are relatively small, for optimal control of the multirotor. The multirotor (1000) includes a chassis (2000) and four or more propellers (5000). The chassis (2000) consists of a main body (2100) and a pair of shafts (2200) (2300), which, for the sake of this explanation, we shall refer to as "pair right shaft" (2200) and "pair left shaft" (2300). A propeller (5000) is attached to the end of each of said shafts and each of said pair of shafts (2200) (2300), or one of them, is connected to the main body (2100) by an axial connection (1018). Assuming the four propellers (5000) operate with the same force, upwards for instance, the multirotor (1000) will ascend vertically in such a way that all four engines (5000) are in one horizontal plane.

Should the user want to yaw the multirotor (1000) say, to the right, he may do so by increasing power in one propeller on the right shaft (2200) and reducing power in the other propeller on the same shaft (2200). This will cause the right shaft (2200) to revolving around the axle (1018) connected to the main body (2100), since one propeller will ascend and the other will descend, resulting in the multirotor yawing to the right.

FIG. 4 depicts the multirotor (1000) yawing clockwise to the right, due to an increase in the thrust of the engine (1014) on the right shaft (2200) and the engine (1020) on the left shaft (2300) (it is possible to reduce the thrust in engines 1016 and 1022 as well, simultaneously) thus causing the multirotor to yaw around the main axle (1026). FIG. 5 depicts the opposite situation in which the multirotor yaws to the left.

A third version of the present invention refers to the aforementioned multirotor (1000) wherein it is also equipped with a free wing (4000) that is attached to the main body (2100) of the chassis (2000) by means of an axial connection, as depicted schematically in FIGS. 6-9 in several positions.

What is claimed is:

1. A multirotor aircraft that comprises a chassis, at least three engines that each of the engines is equipped with a propeller, and at least one axial controlled wing; wherein the axial controlled wing is connected to the chassis by an axial connection; wherein an attack angle of the axial controlled wing is designed to be changed relatively to the chassis due to operation of a wing actuator; wherein the axial controlled wing is designed to be in a lock mode or a free mode;

wherein when said axial controlled wing is at said free mode then said wing actuator is designed to control the axial controlled wing and to bring the axial controlled wing to a specific angle relative to airflow over the axial controlled wing; wherein a direction and intensity of airflow over the axial controlled wing can dictate operation of the wing actuator and determines the specific angle of the axial controlled wing relative to the airflow; wherein the wing actuator includes a computer-controlled wind detector that is designed to sense direction and intensity of airflow over the axial controlled wing;

wherein when said multirotor aircraft is in hovering stage the wing actuator is designed to be in the free mode and the axial controlled wing is designed to be free to rotate axially on said axial connection; wherein when wind flows over said axial controlled wing during hovering then a tilt angle of the axial controlled wing is changed by forces of said wind to a position in which a drag force on said axial controlled wing is reduced; whereby the reducing of said drag enabling a precise hovering relative to a ground point and enabling precise control over the multirotor aircraft; and wherein the axial controlled wing is designed to provide lift force in horizontal flight and in situations of front horizontal wind during hovering whereby reducing the amount of energy required to operate said multirotor aircraft.

2. The multirotor aircraft according to claim 1 that further includes a surface actuator and wherein said axial controlled wing is equipped with, one or more, control surfaces; wherein the surface actuator is designed to control and govern the control surfaces; wherein said surface actuator and control surfaces enabling a control of the strength and directions of lift and drag forces of said axial controlled wing and maneuvering the multirotor aircraft.

3. The multirotor aircraft according to claim 1 that further includes a limiting device which is designed to limit of said axially controlled wing to revolve upward about said axial connection.

4. A multirotor aircraft that comprises a chassis, at least three engines that each of the engines is equipped with a propeller, and a plurality of axial free wings that are connected to the chassis by axial connections;

wherein the a plurality of axial free wings are connected to the chassis by the axial connections in such a way that all leading edges of the a plurality of axial free wings are designed to face same direction when the multirotor aircraft is flying;

wherein the a plurality of axial free wings are connected to the chassis by the axial connections in such a way that attack angles of the a plurality of axial free wings are designed to be changed relatively to the chassis due to flow of air over the a plurality of axial free wings; and wherein the a plurality of axial free wings are connected to the chassis by the axial connections in such a way that the a plurality of axial free wings are designed to be at a loose state and free to rotate axially on said axial connections when said multirotor aircraft is in hovering stage in conditions where there is no wind;

wherein when wind flows over the a plurality of axial free wings during hovering then a tilt angle of the a plurality of axial free wings can be changed by force of said wind to a position in which a drag force on the a plurality of axial free wings is reduced, whereby said drag reduction enables a precise hovering relative to a ground point; and wherein the a plurality of axial free wings are designed to provide lift force in horizontal flight and in conditions of front horizontal wind during hovering, and by that reducing the amount of energy required to operate the multirotor aircraft.

5. The multirotor according to claim 4 that further includes a surface actuator and wherein said a plurality of axial free wings are equipped with, one or more, control surfaces; wherein the surface actuator is designed to control and govern the control surfaces; wherein said surface actuator and control surfaces enabling a control of the strength and directions of lift and drag forces of said a plurality of axial free wings and maneuvering the multirotor.

6. The multirotor aircraft according to claim 4 that further includes a limiting device which is designed to limit said a plurality of axially free wings to revolve upward about said axial connection.

* * * * *